Jan. 29, 1935.  G. F. WALES  1,989,219
BAND MEMBER
Filed May 19, 1931  2 Sheets-Sheet 1
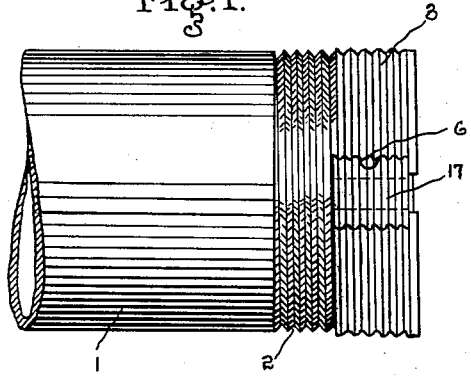
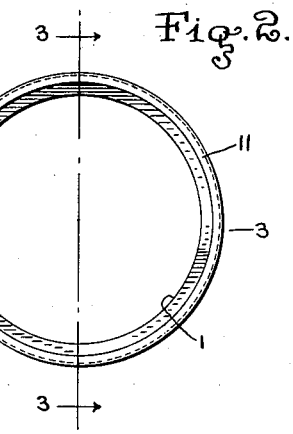
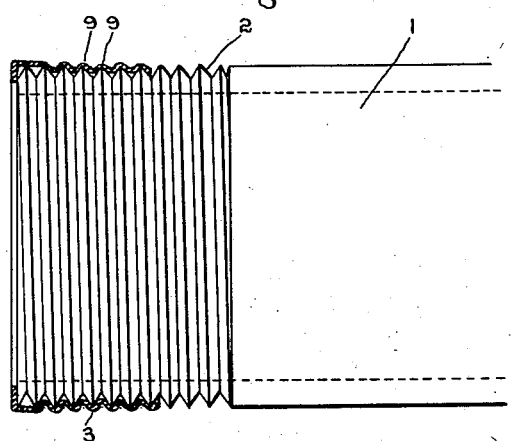
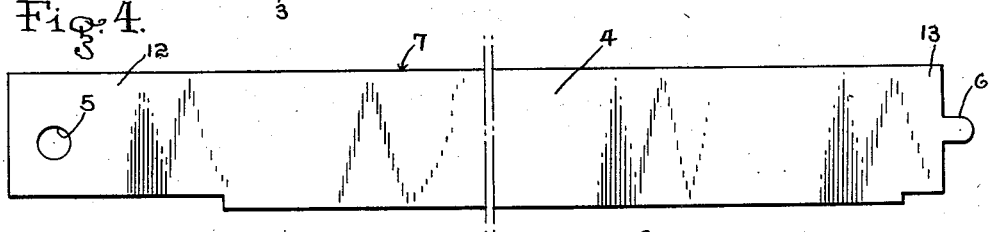
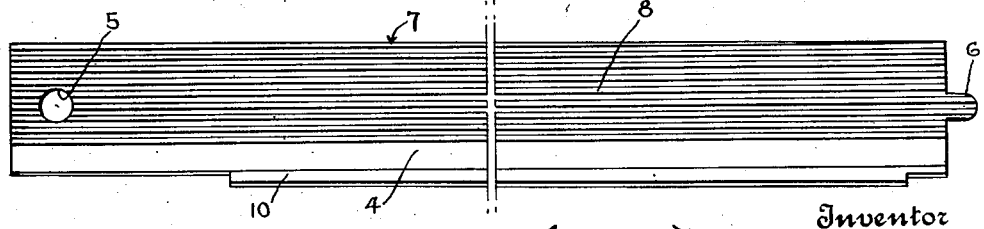
Inventor
George F. Wales
By his Attorney Jan. 29, 1935.  G. F. WALES  1,989,219
BAND MEMBER
Filed May 19, 1931   2 Sheets-Sheet 2
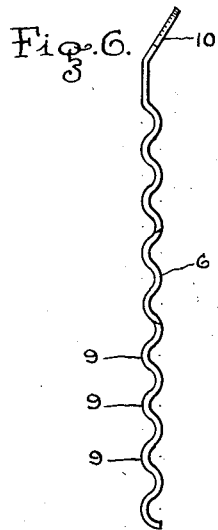
Fig. 6.
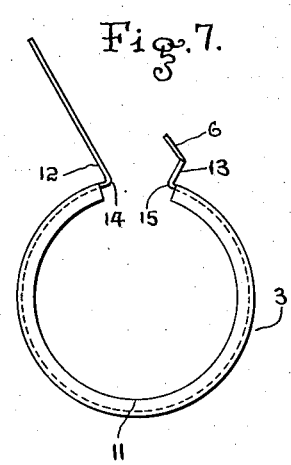
Fig. 7.
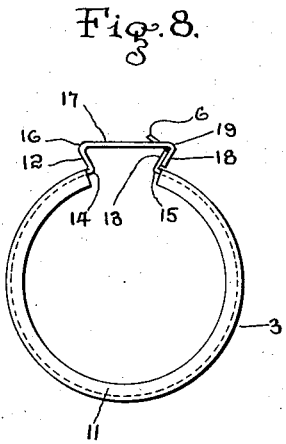
Fig. 8.
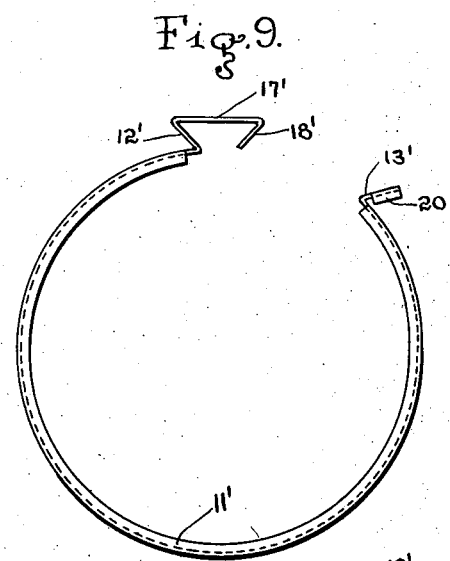
Fig. 9.
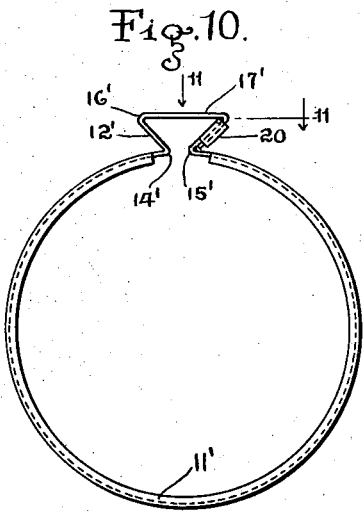
Fig. 10.
Fig. 11.
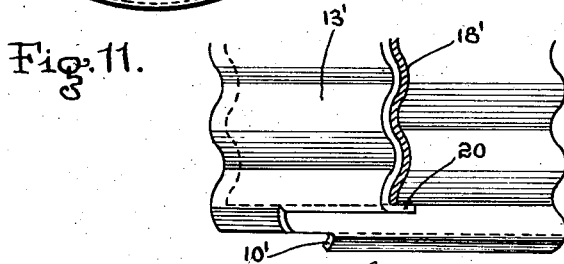
INVENTOR
George F. Wales.
BY his ATTORNEY Patented Jan. 29, 1935

1,989,219

UNITED STATES PATENT OFFICE 1,989,219

BAND MEMBER

George F. Wales, Kenmore, N. Y., assignor to American Radiator Company, New York, N. Y., a corporation of New Jersey Application May 19, 1931, Serial No. 538,425

1 Claim. (Cl. 137—91)

My invention relates to new and useful improvements in band members for surrounding an article or element, either as a protection therefor, or solely as a binding or clamping means. Although the band member or device is particularly adapted for protecting screw threads such as are formed on pipe, and prior to the use of the pipe, it is obvious that the device may be employed as a clamping band wherever such bands are employed. The device is also particularly adapted, for example, for use as a hose clamp, or the like.

An object of my invention is to provide a device operable to exert a binding or compressive force upon an article or element surrounded thereby.

Another object is to provide a device which may be secured tightly about the threads of a screw-threaded member, and which will be of sufficient strength to protect the threads from injury.

Another object is to provide a device which when secured about the screw threads to be protected, will be held against movement across the threads.

The invention consists in the improved construction to be more fully described hereinafter, and the novelty of which will be particularly pointed out and distinctly claimed.

In the accompanying drawings to be taken as a part of this specification, I have fully and clearly illustrated two embodiments of my invention, in which drawings—

Figure 1 is a view in side elevation of a screw-threaded member showing the device of my invention operatively positioned thereon;

Fig. 2 is a view in end elevation looking from right to left of Fig. 1;

Fig. 3 is a view in section through the device on the line 3—3 of Fig. 2;

Fig. 4 is a detail of a blank from which the device is formed;

Fig. 5 is a detail of the blank showing a step in the production of the device;

Fig. 6 is an end view thereof;

Fig. 7 is a view in side or edge elevation showing a further step in the production of the device;

Fig. 8 is a view similar to that of Fig. 7 but showing the device ready for application to a screw-threaded member;

Figs. 9 and 10 are views corresponding to Figs. 7 and 8 but of a modification thereof, and Fig. 11 is a detail view on the line 11—11 of Fig. 10.

Referring to the drawings by characters of reference, 1 designates a member, such, for example, as a pipe, or the like, having external screw threads 2 which are protected by a band or annular member 3, preferably of sheet metal which is bendable, and which surrounds the member 1. The member 3 is preferably formed from a sheet material strip or blank 4, Fig. 4, having at one end a hole or aperture 5 and at its other end a tongue or lug 6 integral therewith, the lug and aperture being of substantially equal lateral dimension, the center of the aperture being laterally offset from a common edge 7 of said blank a distance greater than the lug center is laterally offset therefrom, which distance is preferably substantially equal to one-half of the pitch of the thread to be protected. In Fig. 5 the blank is corrugated longitudinally from end to end, as at 8, as by rolling or pressing, the corrugations serving to reinforce and strengthen the band, the distance between adjacent ridges 9 of the corrugations being substantially equal to the pitch of the thread to be protected. It will be noted that the band is corrugated on both faces thereof (see Fig. 6), and that the lines of the ridges and furrows of the corrugations are substantially parallel to the line of centers of the lug 6 and aperture 5, so that when the ends of the band are brought together and overlapped with the lug 6 in the aperture 5, and with the ridges and furrows interengaged to form a continuous helix, the corrugations will be laterally held together by the resilience of the band, the ends of which have been skewed laterally a distance equal to half the pitch of the thread to be protected, that is, the end of one corrugation furrow or ridge has been positioned or seated in or on the opposite end of the next adjacent corrugation furrow or ridge. The side edge of the band opposite edge 7 has a flange 10 which is bent out of the plane of the band and serves as a stop or limiting means for a purpose to be described. When the band has been corrugated and the flange bent from the plane thereof, the body 11 of the band is bent or formed substantially into a ring or annulus, as in Fig. 7, with the flange 10 extending inwardly toward the center of the ring. It is apparent that the form of the band, when employed merely as a clamping band, may be elliptical or polygonal in order to conform to the element or article to be surrounded thereby. The end or edge portions 12, 13 of the band are directed or bent outward relative to the circumference of the annulus or ring and backward toward the body of the band at an acute angle thereto, that is, they are bent away from each other so that the annular portion of the band body has ends defined by the bends, as at 14, 15, and the part 13 forms a hook at one end of the band. Beyond the bend 14 the portion 12 is bent transversely, as at 16, and directed toward the hook portion 13, in a plane substantially parallel to the end of the body at bend 14, see Fig. 8, so as to provide a connecting-piece or part 17 external of the body of the ring and bridging the space between the bends 14, 15, said part being integral with the end of the band. The portion 12 terminates in a hook part 18 which is bent inward and back toward its body end 14, as at 19, the part 18 being substantially parallel to the portion 13 and adapted to have hooked interlocking engagement therewith, as shown in Fig. 8. Prior to engagement of hook portions 18 and 13, the lug or tongue 6 is bent forward, as in Fig. 7, for passage through aperture 5 as the portions are interlocked. When the band has been closed, as in Fig. 8, with the part 18 hooked over the part 13, it is ready for application to a member to be bound or protected. If the member or element to be protected is the threaded end of a pipe, the reinforcing corrugations will have been so formed that the distance between adjacent ridges is substantially equal to the thread pitch, so that when the band is passed over the pipe end the flange 10 will abut the end face of the pipe and limit passage of the band thereonto, serving to aline the furrows of the corrugations with the grooves of the thread on the pipe. The band may now be clamped tightly about the pipe end by forcing the connecting part 17 toward the pipe, so as to decrease the acute angles at the bends 14, 15 toward zero degrees, to the position shown in Fig. 2. This tightening of the band results from the fact that when the part 17 is moved inward toward the pipe, the lines or points of the bends 14, 15 move as radii about the points or bends 16, 19 respectively, and approach each other and part 17, thus drawing the ends of the band 11 toward each other and shortening the circumference of the band. It may be noted that the force acting to move the band ends, defined by bends 14 and 15, toward each other, is a component of the force applied to part 17, and that the said component which acts along or through the end portions 12, 13 is only limited in its permissible magnitude by the strength and rigidity of the portions 12, 13 and part 17.

In Figs. 9, 10 and 11 I have shown a modification, the parts of which are similar to the band of Figs. 1 to 8, being designated by the primes of the reference characters applied thereto, and which differs from the band of Figs. 1 to 8 inclusive only as follows: The interconnecting lug and aperture are eliminated, and in lieu thereof the portion 13' is provided on the flange side of the band with an abutment or stop portion or member 20, which is directed oppositely to the flange 10' so as to lie across the plane of the part 18' and prevent disengagement of the interlocked corrugations. It may be noted that the stop portion 20 is set in from the band edge a distance substantially equal to half the thread pitch, so that when the ends of the band are joined, the corrugations will be in proper register to form a continuous helix. The application of the band of Figs. 9 to 11 to an element or article, is the same as that of the band of Figs. 1 to 8, and therefore the foregoing description is deemed to be sufficient.

Both of the foregoing types of clamping and protecting band are easily removable from the pipe or clamped article by either inserting a screw driver or other like tool beneath the part 17 and so loosening the band, or by applying a wrench to the band and unscrewing it.

What I claim and desire to secure by Letters Patent of the United States is:

A thread protector comprising an annular member formed of a band of sheet material having circumferentially extending corrugations spaced laterally a distance substantially equal to the pitch of the thread to be protected, the opposite ends of said band being laterally offset whereby said corrugations provide a substantially continuous helical thread internally of said member, one of the end portions of said band being bent outward at an acute angle relative to said band to form a hook, and the other end portion of said band being bent outward and toward said band at an acute angle thereto and having a second bend forming a connecting-piece extending toward said hook, said connecting-piece terminating in a part bent inward at an acute angle to said piece to form a hook to interlock with said first-named hook, whereby when said hooks are interlocked, and the connecting-piece is moved inward relative to the annular member, the ends of said member will be moved toward each other to shorten the circumference of said member.

GEORGE F. WALES.